(12) United States Patent
Bi et al.

(10) Patent No.: US 9,285,883 B2
(45) Date of Patent: Mar. 15, 2016

(54) SYSTEM AND METHOD TO DISPLAY CONTENT BASED ON VIEWING ORIENTATION

(75) Inventors: Ning Bi, San Diego, CA (US); Milivoje Aleksic, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 812 days.

(21) Appl. No.: 13/038,166

(22) Filed: Mar. 1, 2011

(65) Prior Publication Data
US 2012/0223884 A1 Sep. 6, 2012

(51) Int. Cl.
G09G 5/00 (2006.01)
G06F 3/01 (2006.01)
G06F 1/16 (2006.01)
G06F 3/0481 (2013.01)
G06F 3/0483 (2013.01)
G06F 3/0485 (2013.01)

(52) U.S. Cl.
CPC .............. G06F 3/017 (2013.01); G06F 1/1694 (2013.01); G06F 3/011 (2013.01); G06F 3/012 (2013.01); G06F 3/0483 (2013.01); G06F 3/0485 (2013.01); G06F 3/04815 (2013.01)

(58) Field of Classification Search
CPC ....... G06F 3/017; G06F 3/012; G06F 3/0483; G06F 3/04815; G06F 1/1694; G06F 3/011; G06F 3/0485
USPC .................................................. 345/156–158
See application file for complete search history.

(56) References Cited

U.S. PATENT DOCUMENTS

| 6,009,210 A | 12/1999 | Kang |
| 6,201,554 B1 | 3/2001 | Lands |
| 6,351,273 B1 | 2/2002 | Lemelson et al. |
| 6,424,323 B2* | 7/2002 | Bell .................................. 345/9 |
| 6,466,198 B1* | 10/2002 | Feinstein .............. G06F 1/1626 345/158 |
| 6,504,649 B1* | 1/2003 | Myers .................... G02B 5/045 348/59 |

(Continued)

FOREIGN PATENT DOCUMENTS

| CN | 102239460 A | 11/2011 |
| EP | 0825514 A2 | 2/1998 |

(Continued)

OTHER PUBLICATIONS

YouTube—http://www.mirametrix.com: Web Browsing with Your Eyes Using Eye-Scrolling, printed Nov. 5, 2010, 2 pp.

(Continued)

*Primary Examiner* — Rodney Amadiz
(74) *Attorney, Agent, or Firm* — James R. Gambale, Jr.; Michael Kramer

(57) ABSTRACT

An apparatus and method for displaying content is disclosed. A particular method includes determining a viewing orientation of a user relative to a display and providing a portion of content to the display based on the viewing orientation. The portion includes at least a first viewable element of the content and does not include at least one second viewable element of the content. The method also includes determining an updated viewing orientation of the user and updating the portion of the content based on the updated viewing orientation. The updated portion includes at least the second viewable element. A display difference between the portion and the updated portion is non-linearly related to an orientation difference between the viewing orientation and the updated viewing orientation.

45 Claims, 10 Drawing Sheets

(56) References Cited

U.S. PATENT DOCUMENTS

| | | | |
|---|---|---|---|
| 6,886,137 B2 | 4/2005 | Peck et al. | |
| 7,098,914 B1 * | 8/2006 | Katayama et al. | 345/427 |
| 7,365,738 B2 | 4/2008 | Molander et al. | |
| 7,486,350 B2 * | 2/2009 | Yabuta | G02F 1/1323 349/104 |
| 7,777,764 B2 * | 8/2010 | Yoshioka | G02F 1/1323 345/619 |
| 7,817,106 B2 * | 10/2010 | Fukushima | G02F 1/133536 345/32 |
| 7,834,834 B2 * | 11/2010 | Takatani | G02F 1/1323 345/87 |
| 8,031,273 B2 * | 10/2011 | Yabuta | G02F 1/13338 345/173 |
| 8,149,214 B2 * | 4/2012 | Cho | G06F 1/1626 345/156 |
| 8,386,940 B2 * | 2/2013 | Mima | G03G 15/5016 715/759 |
| 8,487,882 B2 * | 7/2013 | Inaba et al. | 345/173 |
| 8,582,152 B2 * | 11/2013 | Eguchi | G03G 15/5016 345/10 |
| 2002/0033834 A1 * | 3/2002 | Beniyama et al. | 345/635 |
| 2002/0143489 A1 | 10/2002 | Orchard | |
| 2004/0100479 A1 * | 5/2004 | Nakano et al. | 345/700 |
| 2005/0212757 A1 | 9/2005 | Marvit et al. | |
| 2005/0248545 A1 | 11/2005 | Nishimura et al. | |
| 2006/0129948 A1 * | 6/2006 | Hamzy et al. | 715/790 |
| 2007/0226647 A1 * | 9/2007 | Louch | 715/788 |
| 2009/0033618 A1 * | 2/2009 | Norager | 345/156 |
| 2009/0040236 A1 * | 2/2009 | Childress et al. | 345/629 |
| 2009/0313584 A1 | 12/2009 | Kerr et al. | |
| 2010/0007657 A1 * | 1/2010 | Rurin | 345/419 |
| 2010/0125816 A1 | 5/2010 | Bezos | |
| 2010/0161084 A1 | 6/2010 | Zhao et al. | |
| 2010/0174421 A1 * | 7/2010 | Tsai et al. | 700/302 |
| 2010/0188426 A1 | 7/2010 | Ohmori et al. | |
| 2010/0225659 A1 * | 9/2010 | Miyazaki | 345/564 |
| 2011/0014977 A1 | 1/2011 | Yamazaki | |
| 2011/0243388 A1 * | 10/2011 | Sakaguchi et al. | 382/103 |

FOREIGN PATENT DOCUMENTS

| | | |
|---|---|---|
| EP | 0874303 B1 | 9/2002 |
| EP | 2293176 A2 | 3/2011 |
| JP | H08263205 A | 10/1996 |
| JP | 2007280461 A | 10/2007 |
| JP | 2010176170 A | 8/2010 |
| JP | 2010286930 A | 12/2010 |
| WO | 9935633 A2 | 1/1999 |
| WO | WO 0039662 A1 * | 7/2000 |
| WO | 0188679 A2 | 11/2001 |
| WO | WO2007003195 A1 | 1/2007 |
| WO | 2009111329 A2 | 9/2009 |
| WO | 2010059328 A2 | 5/2010 |

OTHER PUBLICATIONS

S1 Eye Tracker—http://www.mirametrix.com/s1-eye-tracker.html, printed Nov. 5, 2010, 4 pp.

International Search Report and Written Opinion—PCT/US2012/027157—ISA/EPO—Jul. 12, 2012.

* cited by examiner

SYSTEM AND METHOD TO DISPLAY CONTENT BASED ON VIEWING ORIENTATION

I. FIELD

The present disclosure is generally related to displaying content.

II. DESCRIPTION OF RELATED ART

Advances in technology have resulted in smaller and more powerful computing devices. For example, there currently exist a variety of portable personal computing devices, including wireless computing devices, such as portable wireless telephones, personal digital assistants (PDAs), and paging devices, that are small, lightweight, and easily carried by users. More specifically, portable wireless telephones, such as cellular telephones and internet protocol (IP) telephones, can communicate voice and data packets over wireless networks. Further, many such wireless telephones include other types of devices that are incorporated therein. For example, a wireless telephone can also include a digital still camera, a digital video camera, a digital recorder, and an audio file player. Also, such wireless telephones can process executable instructions, including software applications, such as a web browser application, that can be used to access the Internet. As such, these wireless telephones can include significant computing capabilities. Certain of these portable electronic devices may enable users to access and display content. However, a size or resolution of a display of these portable electronic devices may limit how much content can be displayed at one time.

III. SUMMARY

An apparatus and method to display content is disclosed. In a particular embodiment, the disclosed apparatus and method increase display capacity of an electronic device using viewer-device interactive rendering. For example, in response to a change in a viewing orientation of a user relative to a display, content displayed at the display may be changed. To illustrate, the viewing orientation may include an angle or distance between a face, head or eye of the user and a sensor of the electronic device.

In a particular embodiment, a method of displaying content is disclosed. The method includes receiving displayable content at a device having a display. The displayable content includes a plurality of viewable elements. The method also includes determining a first portion of the displayable content based on a viewing orientation of a user relative to the display and based on a display size of the display. The first portion includes at least a first viewable element of the plurality of viewable elements and does not include at least one second viewable element of the plurality of viewable elements. The method also includes displaying the first portion of the displayable content at the display. The method further includes detecting an updated viewing orientation of the user relative to the display and determining a second portion of the displayable content based on the updated viewing orientation. The second portion includes at least the second viewable element. A display difference between the first portion and the second portion is non-linearly related to an orientation difference between the viewing orientation and the updated viewing orientation. The method includes displaying the second portion at the display.

In another particular embodiment, an apparatus to display content is disclosed. The apparatus includes a processor and a memory coupled to the processor. The memory includes content including a plurality of viewable elements. The memory also includes instructions that are executable by the processor to determine a viewing orientation of a user relative to a display. The instructions are executable by the processor to provide a first portion of the content to the display based on the viewing orientation. The first portion includes at least a first viewable element of the content and does not include at least one second viewable element of the content. The instructions are also executable by the processor to determine an updated viewing orientation of the user and to provide an updated portion of the content to the display based on the updated viewing orientation. The updated portion includes at least the second viewable element. A display difference between the first portion and the updated portion is non-linearly related to an orientation difference between the viewing orientation and the updated viewing orientation.

In another particular embodiment, an apparatus to display content is disclosed. The apparatus includes interface means to generate a user interface for display at a display device. The user interface includes a portion of content determined based on a viewing orientation of a user relative to the display device. The apparatus also includes orientation detection means to determine the viewing orientation and to detect a change in the viewing orientation. A first portion of the content is determined based on a first viewing orientation. The first portion includes at least a first viewable element of the content and does not include at least one second viewable element of the content. A second portion of the content is determined in response to a change in the viewing orientation to a second viewing orientation. The second portion of the content includes at least the second viewable element. A display difference between the first portion and the second portion is non-linearly related to an orientation difference between the first viewing orientation and the second viewing orientation.

In another particular embodiment, a non-transitory computer-readable medium is disclosed. The non-transitory computer-readable medium includes processor-executable instructions that, when executed by a processor, cause the processor to determine a viewing orientation of a user relative to a display. The instructions are further executable by the processor to cause the processor to provide a portion of content to the display based on the viewing orientation. The portion includes at least a first viewable element of the content and does not include at least one second viewable element of the content. The instructions are also executable by the processor to cause the processor to determine an updated viewing orientation of the user and to update the portion of the content based on the updated viewing orientation. The updated portion includes at least the second viewable element. A display difference between the portion and the updated portion is non-linearly related to an orientation difference between the viewing orientation and the updated viewing orientation.

One particular advantage provided by at least one of the disclosed embodiments is that users may access and view more information via a relatively small or low resolution screen of an electronic device.

Other aspects, advantages, and features of the present disclosure will become apparent after review of the entire application, including the following sections: Brief Description of the Drawings, Detailed Description, and the Claims.

IV. BRIEF DESCRIPTION OF THE DRAWINGS

V. DETAILED DESCRIPTION

Figure 1:
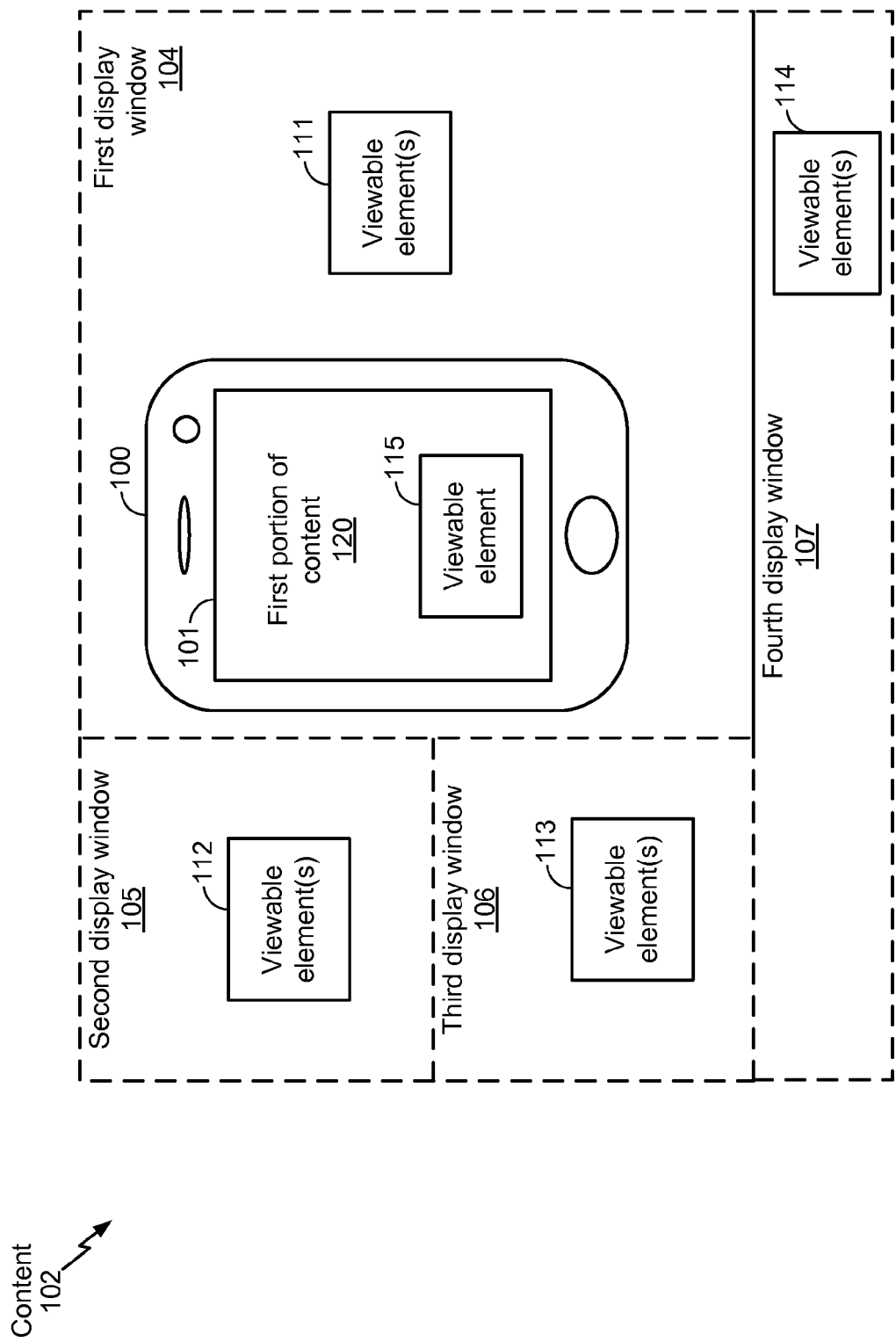
FIG. 1 is a diagram of a particular illustrative embodiment of a system to display content.

FIG. 1 is a diagram of a particular illustrative embodiment of a system to display content. In FIG. 1, a computing device 100 includes or is coupled to a display 101. The computing device 100 may include a memory (not shown in FIG. 1) that stores content 102 for display via the display 101. The computing device 100 may also include a network interface, such as a wireless interface or a wired network interface (not shown in FIG. 1) to retrieve the content 102. The computing device 100 may be a portable electronic device, such as a camera, a mobile telephone, a portable computer, a personal digital assistant, a portable media player, a tablet computer, or any combination thereof.

FIG. 1 illustrates a situation in which the content 102 is too large to be conveniently displayed all together at the display 101. For example, a size or a resolution of the display 101 may limit how much of the content 102 can be usefully presented at the display 101 at one time. Thus, only a first portion 120 of the content 102 is displayed and other portions of the content 102 are not displayed.

The content 102 may include a plurality of viewable elements 111-115. While the example illustrated in FIG. 1 includes four display windows 104-107 with viewable elements 111-115, the content 102 may include more than four display windows or fewer than four display windows. Additionally, the content 102 may include more than or fewer than the viewable elements 111-115 shown in FIG. 1. The viewable elements 111-115 may include information, text, graphics, images, multi-media content, other viewable elements, or any combination thereof. The viewable elements 111-115 may be associated with one or more of the display windows 104-107. Two or more of the display windows 104-107 may be interdependent (e.g. a second display window 105 may be a pop-up window or other sub-window of a first display window 104). Two or more of the display windows 104-107 may be independent. For example, the first display window 104 may include a user interface display of a first application, and a third display window 106 may include a user interface display of a second application. Closing or otherwise interacting with the first application may not affect the second application. Thus, the first display window 104 may be independent of the third display window 106. In another example, the fourth display window 107 may include a user interface associated with a second instance of the first application. Closing or otherwise interacting with a first instance of the first application via the first display window 104 may not affect the second instance of the first application. Thus, the first display window 104 and the fourth display window 107 may be independent of each other.

To improve user interaction with the content 102, the first portion 120 of the content 102 may be updated in response to a change of viewing orientation of a user relative to the display 101. For example, the first portion 120 may include the first viewable element 115. The other viewable elements 111-114 may not be included in the first portion 120. However, in response to detecting a change in the viewing orientation, a second viewable element, such as one of the viewable elements 111-114, may be presented via the display 101 as a second portion of the content 102. A measured amount of the change in the viewing orientation may be used to determine which portion or portions of the content 102 are present at the display 101. In a particular embodiment, as explained further below, the change in the content 102 that is presented via the display 101 is non-linearly related to the change in the viewing orientation.

Figure 2:
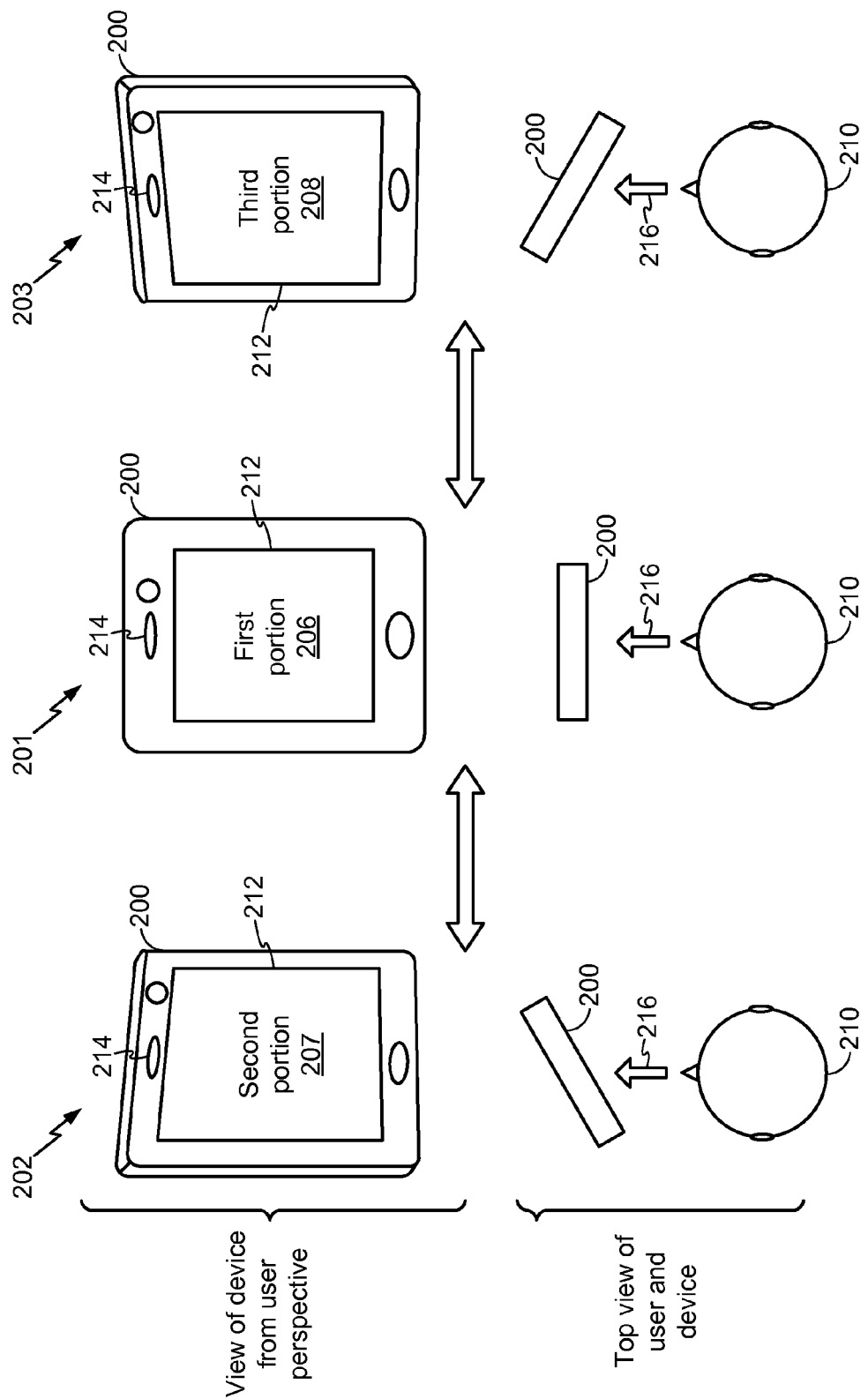
FIG. 2 is a diagram of a particular illustrative embodiment of a system to display content.

FIG. 2 is a diagram of a particular illustrative embodiment of a system to display content. In particular, FIG. 2 illustrates a user 210 interacting with a computing device 200 to change a portion of content that is displayed at a display 212 of the computing device 200. Three different viewing orientations of the user 210 relative to the display 212 are illustrated.

For convenience of description, a viewing angle of the user 210 relative to the display 212 is described as an angle between a line of sight 216 of the user 210 and a plane of the display 212. To illustrate, in a first viewing orientation 201, the user 210 directly faces the display 212 of the computing device 200. Thus, the viewing angle between the user 210 and the display 212 is approximately ninety degrees. That is, the display 212 is approximately perpendicular to the line of sight 216 of the user 210. An alternative manner of characterizing the viewing angle (which is not used herein unless otherwise indicated by the particular context) would be to measure the viewing angle relative to a normal (not shown) of the display 212. Considered in this manner, the viewing angle of the user 210 relative to the computing device 200 in the first viewing orientation 201 would be approximately zero degrees.

In the first viewing orientation 201, a first portion 206 of content may be displayed at the display 212. The content may include a plurality of viewable elements, such as images, windows, graphical elements, and so forth. For example, the first portion 206 may correspond to the first portion 120 of the content of FIG. 1. The user 210 may change from the first viewing orientation 201 to a second viewing orientation 202 by moving the user's face or head to the left, or by rotating the display 212 to the right. In response to changing to the second viewing orientation 202, a second portion 207 of the content may be displayed at the display 212. The second portion 207 of the content may include content that was not displayed in the first portion 206 of the content. To illustrate, the second portion 207 may correspond to a portion of the content 102 of FIG. 1 that is not included in the first portion 120 of the content 102, such as one of the viewable elements 111-114. The first portion 206 of the content may include a first viewable element but not a second viewable element of the content, and the second portion 207 may include the second viewable element. To illustrate, the first portion 206 may include a first portion of a display window and the second portion 207 may include a second portion of the display window that was not displayed in the first portion 206. In another illustrative example, the first portion 206 may include a first display window and the second portion 207 may include a second display window that is independent of the first display window. For example, the first display window may include a user interface associated with a first application operating at the computing device 200 and the second display window may include a second user interface associated with the first application, a user interface associated with a second instance of the first application, or a user interface associated with a second application operating at the computing device 200.

In response to changing to a third viewing orientation 203, a third portion 208 of the content may be displayed at the display 212. The user 210 may change from the first viewing orientation 201 to the third viewing orientation 203 by moving the user's face or head to the right, or by rotating the display 212 to the left. The third portion 208 of the content may include content that was not displayed in the first portion 206 of the content, content that was not displayed in the second portion 207, or content that was not displayed in either the first portion 206 or the second portion 207. For example, the third portion 208 may correspond to a portion of the content 102 of FIG. 1 that is not included in the first portion 120 of the content 102, such as one of the viewable elements 111-114.

An amount of change of the portion of the content that is displayed may be non-linearly related to an amount of change in the viewing orientation. For example, when the viewing orientation is changed a first amount that is relatively small (e.g., less than a threshold amount), the portion of the content displayed may not be changed. When the viewing orientation is changed a second amount that is larger than the first amount (e.g., is greater than the threshold amount), the portion of the content displayed may be changed. Further, when the viewing orientation is changed a third amount that is greater than the second amount (e.g., is greater than a second threshold amount), the portion of the content may be changed in a different manner than when the second threshold amount is not satisfied. To illustrate, when the viewing orientation change is between the first threshold amount and the second threshold amount, a portion of content within a particular window may be displayed. However, when the viewing orientation change is greater than the second threshold amount, a different window may be displayed.

In another example, the portion of the content displayed may continue to be updated as long at the viewing orientation is changed from a "neutral orientation" (e.g., within a threshold amount of the first viewing orientation 201). To illustrate, the content displayed may scroll while the device 200 is at the second viewing orientation 202 and may stop scrolling when the device is returned to the first viewing orientation 201. In this example, a rate at which the content scrolls in the display 212 may be non-linearly related to the viewing orientation.

In a particular embodiment, the viewing orientation or a change in the viewing orientation may be determined using a sensor 214 of the computing device 200. For example, the sensor 214 may include a camera that may be used to capture images to be analyzed to determine a location of an eye of the user 210 or a location of a portion of the face of the user 210 relative to the display 212. When the relative position of the eye or the portion of the face changes, a change in the viewing orientation may be detected resulting in a change in the portion of the content that is displayed. In another example, the sensor 214 may include another passive sensor that is able to detect an ambient or environmental condition to estimate the viewing orientation. In another example, the sensor 214 may include an active sensor that is adapted to transmit a signal and to determine the viewing orientation based on a response to or a change in the signal.

Thus, in response to the user 210 changing the viewing orientation, portions of content may be displayed that were not previously visible. An amount of change of the portion displayed may be non-linearly related to an amount of change in the viewing orientation. This non-linear relationship may enable the user 210 to access and display a large range of content easily.

Figure 3:
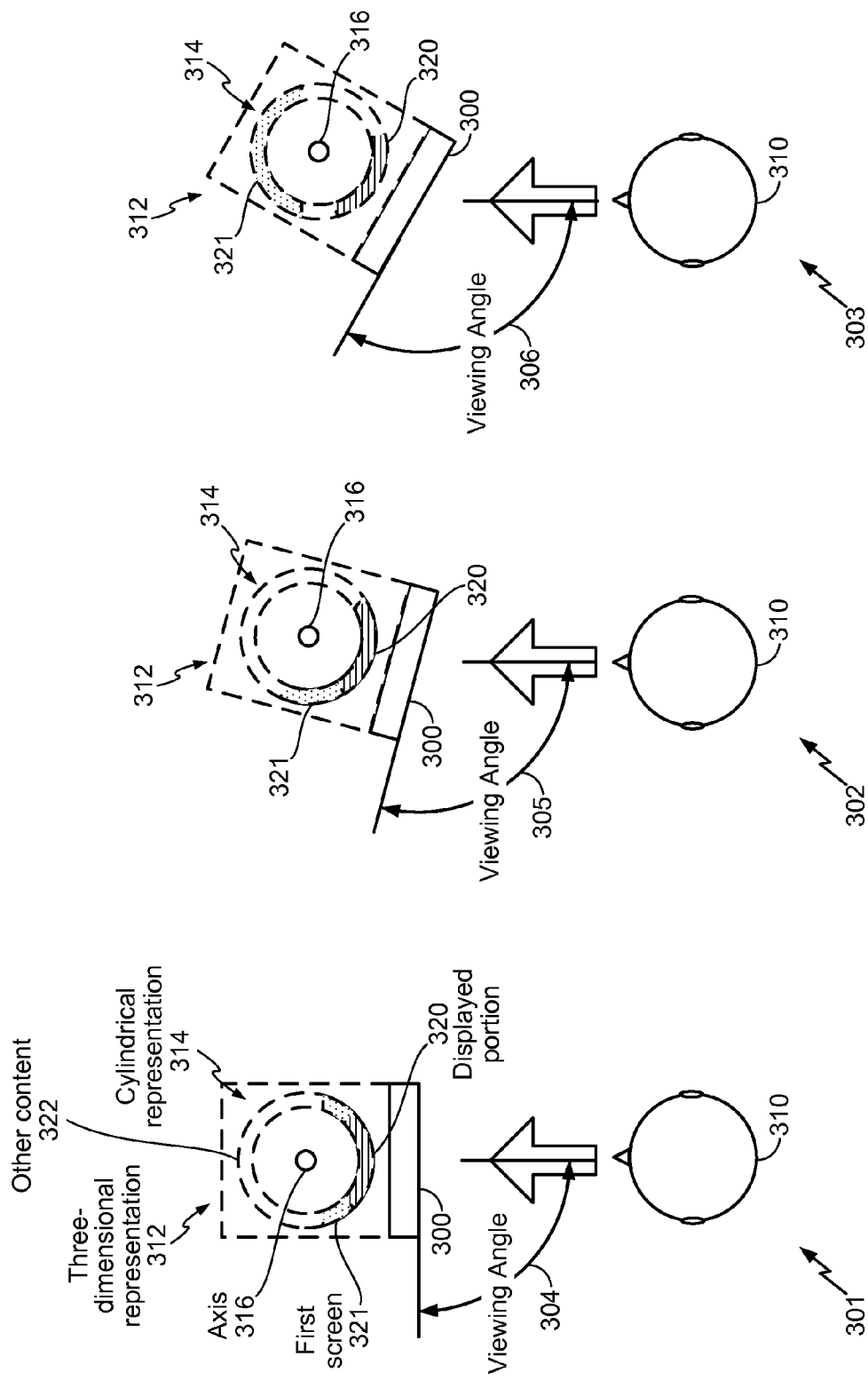
FIG. 3 is a diagram of a particular illustrative embodiment of a system to display content.

FIG. 3 is a diagram of a particular illustrative embodiment of a system to display content. At a first time 301, a user 310 has a first viewing angle 304 relative to a display 300. At the first viewing angle 304, a portion of content (indicated as displayed portion 320) is presented via the display 300. For example, the displayed portion 320 may be a portion of a first screen 321. The content may also include other content 322 that is not displayed at the first time 301. For example, the displayed portion 320 of the content at the first time 301 may correspond to the first portion 120 of the content 102 of FIG. 1, and the first screen 321 may correspond to the first display window 104. Portions of the first screen 321 that are not in the displayed portion 320 may correspond to the viewable elements 111-114 of FIG. 1 that are not displayed in the first portion 120 of the content 102. The other content 322 may correspond to other display windows of FIG. 1, such as the second display window 105, the third display window 106, the fourth display window 107, or any combination thereof.

At a second time 302, the user 310 has a second viewing angle 305 relative to the display 300. As a result, the displayed portion 320 is updated to include different content. For example, another portion of the first screen 321 may be presented via the display 300 at the second time 302. Additionally, some portions of the first screen 321 that were displayed at the first time 301 may not be displayed at the second time 302.

At a third time 303, the user 310 has a third viewing angle 306 relative to the display 300 and the displayed portion 320 includes different content. For example, the displayed portion 320 may include a portion of the other content 322 and may not include the first screen 321.

FIG. 3 also illustrates a particular embodiment in which the display 300 represents information via a three-dimensional presentation 312. For example, the three-dimensional representation 312 may include a cylindrical representation 314 or another three-dimensional representation. Information, such as viewable elements of the content, may be represented as portions of a surface of the cylindrical representation 314. In the embodiment illustrated in FIG. 3, the cylindrical representation 314 has an axis 316 about which the cylindrical representation 314 may be rotated to change the displayed portion 320. In this embodiment, the user 310 is able to see the displayed portion 320 while the other content 322 of the cylindrical representation 314 is not visible via the display 300. A computing device associated with the display 300 may track relative locations of the user 310 and the display 300 in order to render the displayed portion 320 of the content as the cylindrical representation 314 is rotated in response to changes in the viewing orientation.

FIG. 3 further illustrates that a relationship between a change in the viewing angle and a change in the displayed portion 320 may be non-linear. For example, when the viewing angle is changed from the first viewing angle 304 to the second viewing angle 305, the displayed portion 320 may include content selected from the first screen 321. However, when the viewing angle is changed from the first viewing angle 304 to the third viewing angle 306, the displayed portion 320 may include content that is not from the first screen 321 (i.e., is from the other content 322).

Figure 4:
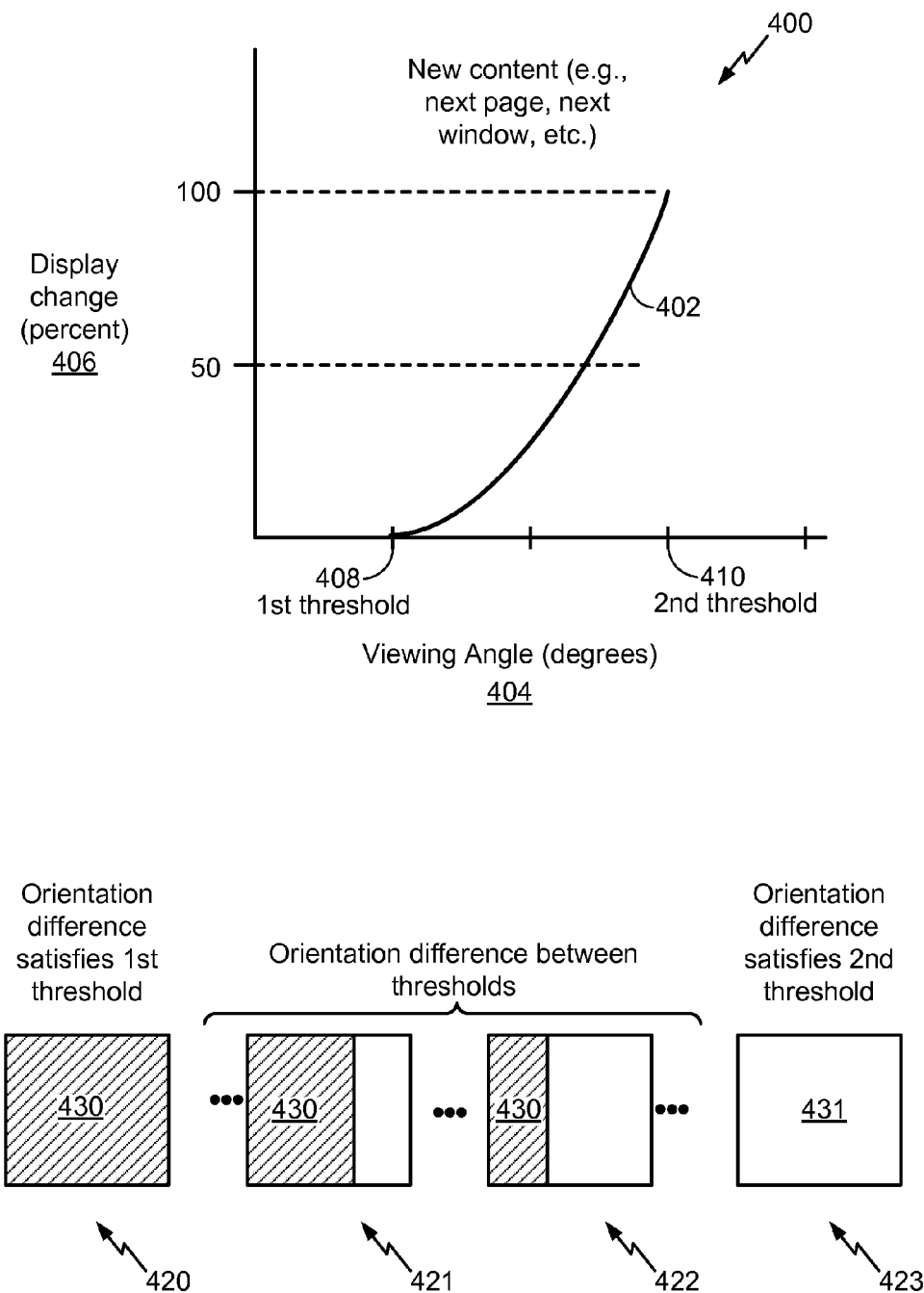
FIG. 4 is a diagram illustrating a method of displaying content according to a particular illustrative embodiment.

FIG. 4 is a diagram illustrating a method of displaying content according to a particular illustrative embodiment. FIG. 4 includes a graph 400 illustrating a particular non-linear relationship 402 between a viewing angle 404 and a display change 406. The relationship 402 may be a geometric relationship, a log relationship, a discontinuous relationship, or another non-linear relationship. The relationship 402 illustrated in FIG. 4 is only one particular illustration of a non-linear relationship between the viewing angle 404 and the display change 406 that may be used in various embodiments.

For ease of description, FIG. 4 also illustrates several views 420-423 of a display corresponding to different portions of the relationship 402. In a particular embodiment, when the viewing angle 404 is changed by an amount that does not satisfy a first threshold 408, the display is not changed (that is, the display change 406 is zero). Thus, at 420, the display is shown that includes first content 430. When the viewing orientation is changed by an amount that is greater than the first threshold 408, the display may be changed by an amount that is non-linearly related to the viewing angle 404 or the change in the viewing angle 404. For example, at 421 and 422, some of the first portion 430 may be excluded from the display and replaced by other content.

In a particular embodiment, the relationship 402 includes a second threshold 410. When the viewing angle 404 is changed by an amount that satisfies the second threshold 410, the display may be changed in a different manner or at a different rate than when the viewing angle is changed by an amount that is between the first threshold 408 and the second threshold 410. To illustrate, at 423, when the second threshold 410 is satisfied, the first content 430 may be entirely replaced by new content 431. The new content 431 may correspond to a next page of the content associated with the first content 430 (e.g., a subsequent page of text, a subsequent image in a slideshow, a subsequent file in a file system, etc.). The new content 431 may correspond to a next window. To illustrate, referring to FIG. 1, the first content 430 may correspond to the first display window 104 and the new content 431 may correspond to one of the other display windows 105-107. In this example, when the first threshold 408 is satisfied and the second threshold 410 is not satisfied, the display 101 of FIG. 1 may show a different portion of the first display window 104. However, when the second threshold 410 is satisfied, the display 101 of FIG. 1 may change to a different display window, such as the second display window 105.

Figure 5:
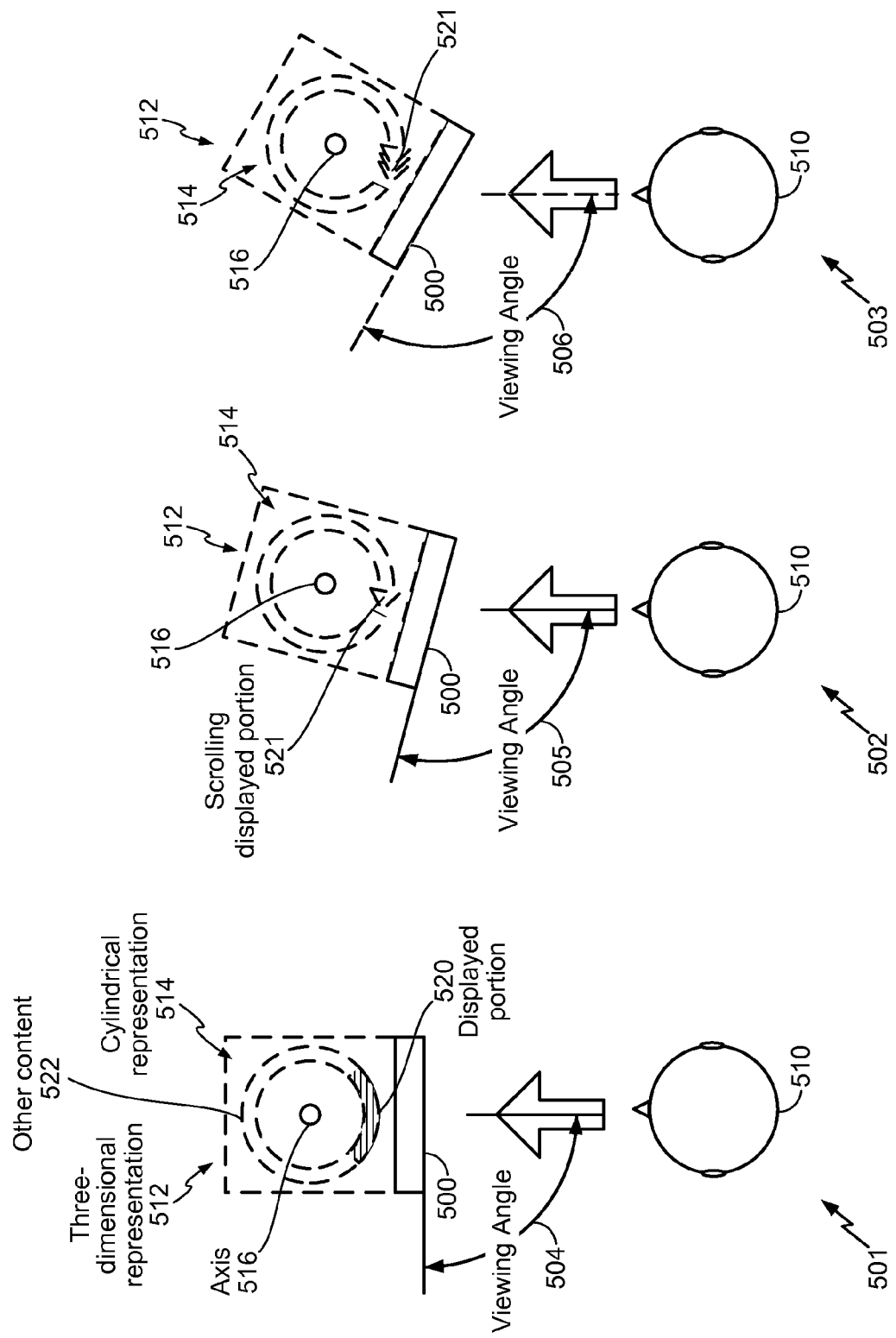
FIG. 5 is a diagram of a particular illustrative embodiment of a system to display content.

FIG. 5 is a diagram of a particular illustrative embodiment of a system to display content. At a first time 501, a user 510 has a first viewing angle 504 relative to a display 500. At the first viewing angle 504, a portion of content (indicated as displayed portion 520) is presented via the display 500. For example, the displayed portion 520 of the content at the first time 501 may correspond to the first portion 120 of the content 102 of FIG. 1. Portions of the content that are not in the displayed portion 520 (i.e., other content 522) may correspond to the viewable elements 111-114 of FIG. 1 that are not displayed in the first portion 120 of the content 102, other display windows (e.g., the second display window 105, the third display window 106, the fourth display window 107), or any combination thereof.

At a second time 502, the user 510 has a second viewing angle 505 relative to the display 500. As a result, the displayed portion 520 is updated to include different content. For example, a scrolling displayed portion 521 (indicated by an arrow in FIG. 5) may be presented via the display 500 at the second time 502. The scrolling displayed portion 521 may scroll at a first scroll rate that is related to the second viewing angle or to an amount of change between the first viewing angle 504 and the second viewing angle 505. At a third time 503, the user 510 has a third viewing angle 506 relative to the display 500 and the scrolling displayed portion 521 may scroll at a different scroll rate. The scroll rate may be represented as a floating point number related the particular change in the viewing angle.

In FIG. 5, the display 500 represents information via a three-dimensional representation 512. For example, the three-dimensional representation 512 may include a cylindrical representation 514 or another three-dimensional representation. Information, such as viewable elements of the content, may be rendered as portions of a surface of the cylindrical representation 514. In the embodiment illustrated in FIG. 5, the cylindrical representation 514 has an axis 516 about which the cylindrical representation 514 may be rotated to change the displayed portion 520. For example, rotation of the cylindrical representation 514 about the axis 516 may correspond to scrolling of the scrolling display portion 521.

FIG. 5 also illustrates that a relationship between a change in the viewing angle and a change in content presented at the display 500 may be non-linear. For example, when the viewing angle is changed from the first viewing angle 504 to the second viewing angle 505, the scrolling displayed portion 521 may scroll at a first rate. When the viewing angle is changed from the first viewing angle 504 to the third viewing angle 506, the scrolling displayed portion 521 may scroll at a second rate. The first and second rates may be selected in a manner that is non-linearly related to the change in the viewing angle.

Figure 6:
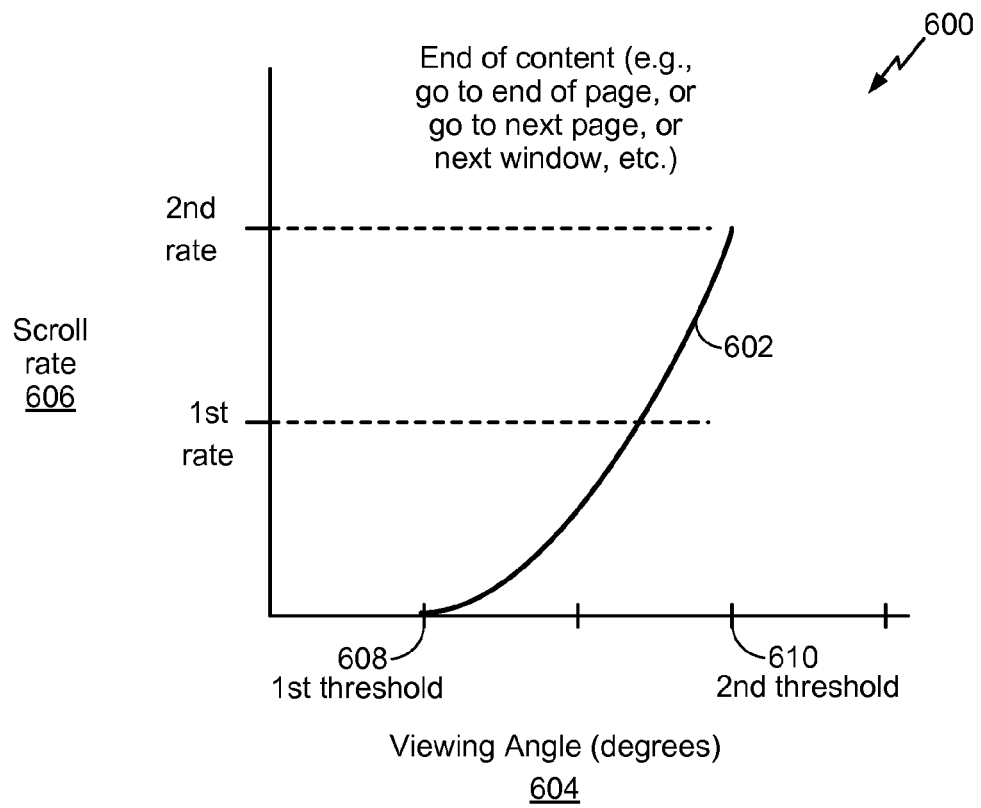
FIG. 6 is a diagram illustrating a method of displaying content according to a particular illustrative embodiment.
Figure 6:
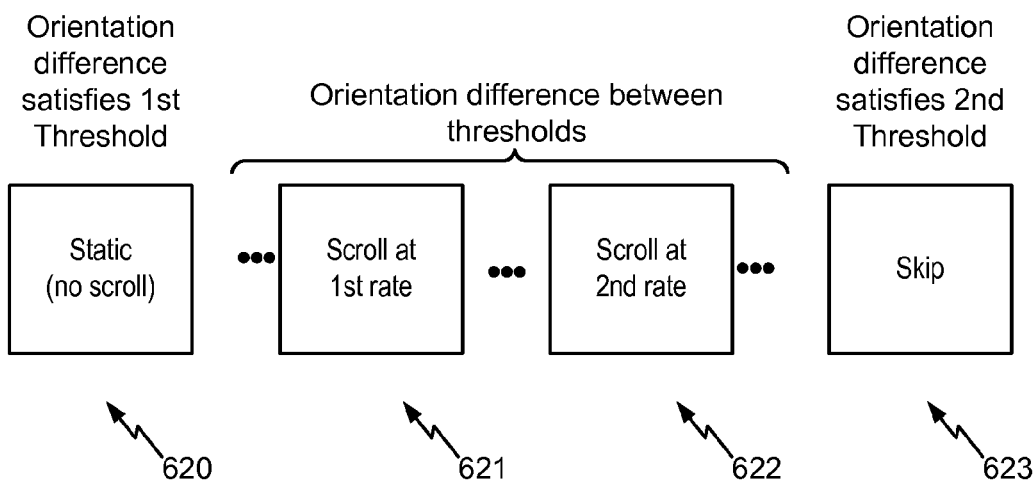

FIG. 6 is a diagram illustrating a method of displaying content according to a particular illustrative embodiment. FIG. 6 includes a graph 600 illustrating a particular non-linear relationship 602 between a viewing angle 604 and a display change, indicated by a scroll rate 606. The relationship 602 may be a geometric relationship, a log relationship, a discontinuous relationship, or another non-linear relationship. The relationship 602 illustrated in FIG. 6 is one particular example of a non-linear relationship between the viewing angle 604 and the scroll rate 606 that may be used in various embodiments.

For ease of description, FIG. 6 also illustrates several views 620-623 of a display corresponding to different portions of the relationship 602. In a particular embodiment, when the viewing angle 604 is changed by an amount that does not satisfy a first threshold 608, the display is not changed (that is, the scroll rate 606 is zero). Thus, at 620, the display is static, with no scroll. When the viewing orientation is changed by an amount that satisfies the first threshold 608, the display may scroll at a scroll rate that varies according to the relationship 602 based on the viewing angle 604 or the viewing angle change. For example, at 621, the display scrolls at a first scroll rate, and, at 622, the display scrolls at a second scroll rate.

In a particular embodiment, the relationship 602 includes a second threshold 610. When the viewing angle 604 is changed by an amount that satisfies the second threshold 610, the display may be changed in a manner that is different than merely changing the scroll rate. For example, at 623, when the second threshold 610 is satisfied, the display may skip particular content. To illustrate, when the second threshold 610 is satisfied, the display may advance to an end of the content (e.g., an end of a current page or file). In another example, when the second threshold 610 is satisfied, the display may skip some content and advance to subsequent content, such as a next window, a next page or a next file.

Figure 7:
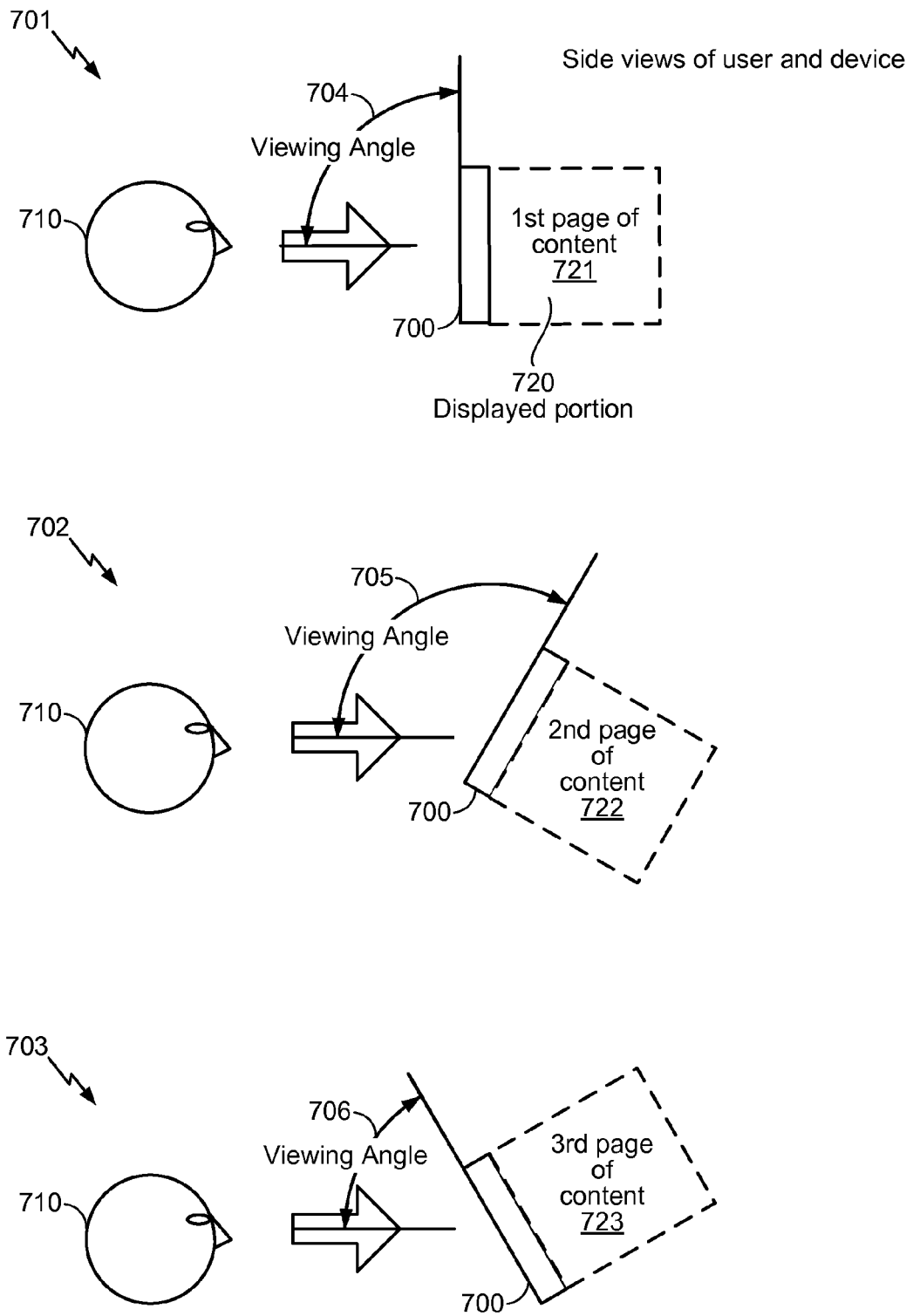
FIG. 7 is a diagram of a particular illustrative embodiment of a system to display content.

FIG. 7 is a diagram of a particular illustrative embodiment of a system to display content. FIG. 7 illustrates another particular embodiment of a series of changes in a viewing angle between a user 710 and a display 700. In FIG. 7, the change in the viewing angle may be a vertical change whereas at FIGS. 3 and 5 the change in viewing angle was represented as a horizontal change in viewing angle.

At a first time 701, the user 710 has a first viewing angle 704 relative to the display 700, and a displayed portion 720 of content including a first page of content 721 may be presented via the display 700. At a second time 702, the user 710 may have a second viewing angle 705 relative to the display 700, and a second page 722 of the content may be presented via the display 700. At a third time 703, the user may have a third viewing angle 706 relative to the display 700, and a third page 723 of the content may be presented via the display 700. Thus, a change in viewing orientation in any direction may be used to update a displayed portion of content. To illustrate, the change in the viewing orientation may include vertical changing in a viewing angle, a horizontal change in the viewing angle, or a combination thereof. In other examples, the change in the viewing orientation may include a change in distance between the user 710 and the display 700.

Figure 8:
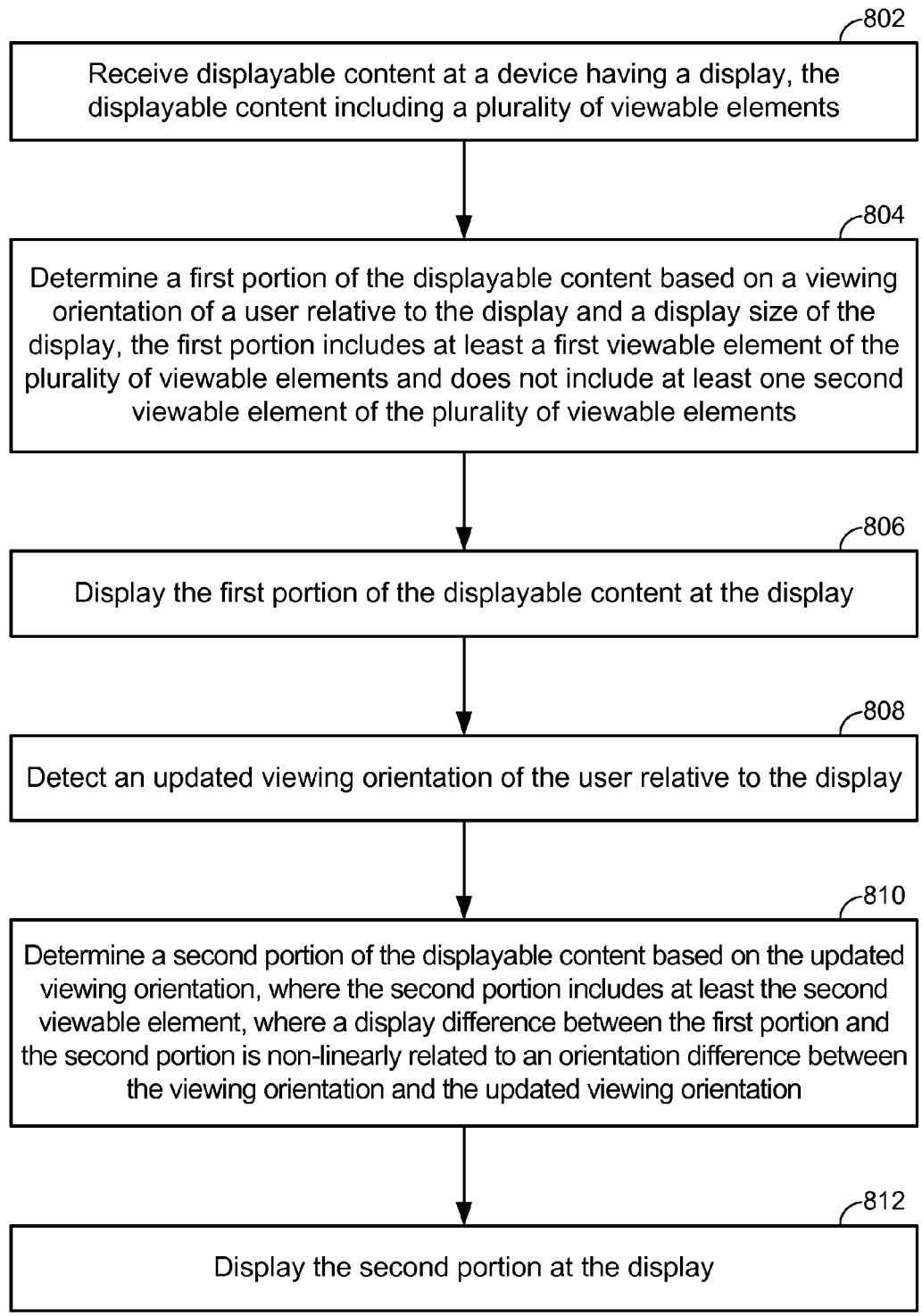
FIG. 8 is a flow chart of a particular illustrative embodiment of a method to display content.

FIG. 8 is a flow chart of a particular illustrative embodiment of a method to display content. The method includes, at 802, receiving displayable content at a device having a display. The displayable content may include a plurality of viewable elements. For example, the device may be the device 100 of FIG. 1, and the plurality of viewable elements may correspond to the viewable elements 111-115 of the display windows 104-107 of the content 102.

The method may also include, at 804, determining a first portion of the displayable content based on a viewing orientation of a user relative to the display and a display size of the display. The first portion may include at least a first viewable element of the plurality of viewable elements and does not include at least one second viewable element of the plurality of viewable elements. To illustrate, referring to FIG. 1, the first portion 120 of the content 102 includes a first viewable element 115 of the first display window 104 and does not include a second viewable element, such as the viewable elements 111-114.

The method also includes, at 806, displaying the first portion of the displayable content at the display. When an updated viewing orientation of the user relative to the display is detected, at 808, the method may include determining a second portion of the displayable content based on the updated viewing orientation, at 810. The second portion includes at least the second viewable element. A display difference between the first portion and the second portion may be non-linearly related to an orientation difference between the viewing orientation and the updated viewing orientation. For example, the second display portion may include the viewable element 111, the viewable element 112, the viewable element 113 or the viewable element 114 of FIG. 1. The method may also include, at 812, displaying the second display portion at the display.

The method of FIG. 8 may be implemented by a field-programmable gate array (FPGA) device, an application-specific integrated circuit (ASIC), a processing unit such as a central processing unit (CPU), a digital signal processor (DSP), a graphics processing unit (GPU), a controller, another hardware device, a firmware device, or any combination thereof. As an example, the method of FIG. 8 can be performed by a processor that executes instructions.

Figure 9:
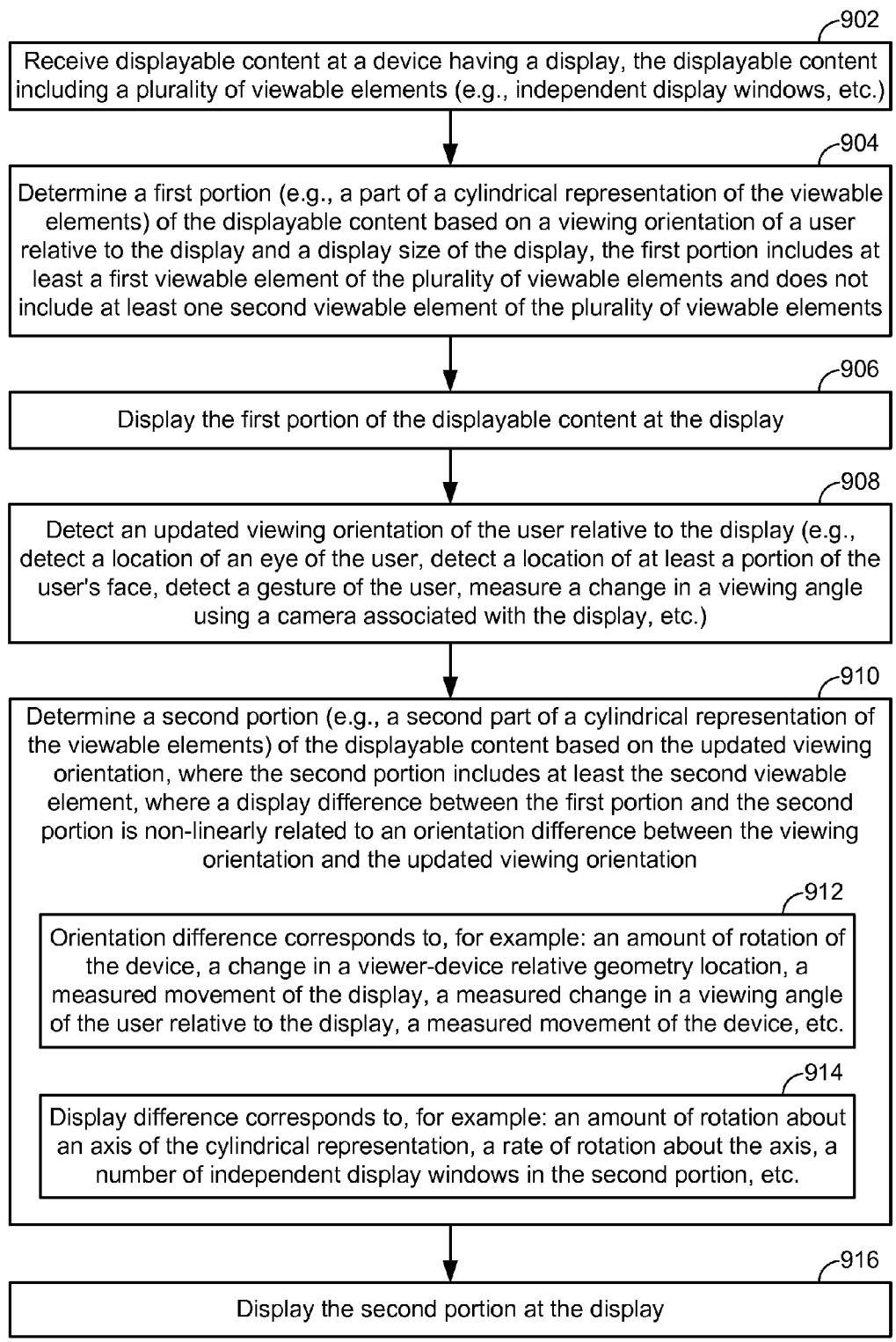
FIG. 9 is a flow chart of a particular illustrative embodiment of a method to display content.

FIG. 9 is a flow chart of a particular illustrative embodiment of a method to display content. The method includes, at 902, receiving displayable content at a device having a display. The displayable content may include a plurality of viewable elements. For example, the viewable elements may correspond to or be included within one or more display windows. To illustrate, referring to FIG. 1, the content 102 may correspond to one or more of the display windows 104-107, which include the plurality of viewable elements 111-115.

The method may also include, at 904, determining a first portion of the displayable content based on a viewing orientation of a user relative to the display and a display size of the display. The first portion includes at least a first viewable element of the plurality of viewable elements and does not include at least one second viewable element of the plurality of viewable elements. In a particular embodiment, the first portion may correspond to a portion of a three-dimensional representation around which the plurality of viewable elements is arranged. For example, the plurality of viewable elements may be arranged about the cylindrical representation 314 of FIG. 3 or the cylindrical representation 514 of FIG. 5, and the first portion may correspond to part of the cylindrical representation that is displayed. Thus, at least one viewable element that is received, at 902, is not displayed in the first portion.

The method may also include, at 906, displaying the first portion of the displayable content at the display. The first portion may correspond to a particular portion of a single display window. Alternately, the first portion may include portions of one or more independent display windows, such as windows associated with different instances of a particular application or windows associated with different applications. The windows may be independent such that closing one of the windows may not affect the other windows. For example, referring to FIG. 1, the first portion 120 of the content may correspond to a portion of the first display window 104 that also includes other viewable elements 111 that are not displayed.

The method may also include, at 908, detecting an updated viewing orientation of the user relative to the display. The updated viewing orientation may be detected based on a measured change in the viewing angle using a camera or other sensor associated with the display or by using relative motion of the display device. For example, the updated viewing orientation may be detected based on a location of an eye of the user relative to the display using a camera of the display device. In another example, the updated viewing orientation may be detected based on a location of at least a portion of the user face using the camera. In still another example, the updated viewing orientation may be detected based on a gesture of the user using the camera. The viewing orientation and the updated viewing orientation may also or in the alternative be determined based on a measured movement of the display device. Other sensors or methods may also be used to determine the orientation difference that corresponds to measuring changes in a viewer-device relative geometry location.

The method may also include, at 910, determining a second portion of the displayable content based on the updated viewing orientation. The second portion may include the second viewable element that was not included in the first portion. A display difference between the first portion and the second portion may be non-linearly related to an orientation difference between the viewing orientation and the updated viewing orientation. In a particular embodiment, at 912, the orientation difference corresponds to a measured movement of the device (e.g., an amount of rotation or other movement of the device as detected by a motion detector of the device), a change in the viewer-device relative geometry location, a measured movement of the display, a measured change in viewing angle of the user relative to the display (e.g., measured using a camera associated with the display), or any combination thereof.

The display difference may correspond to, at 914, an amount of rotation about an axis of a three-dimensional representation (e.g., a cylindrical representation) that includes the plurality of viewable elements, a rate of rotation of the three-dimensional representation about an axis, a number of independent display windows or other distinct viewable elements that are in the second portion that are not in the first portion, a number of independent display windows or other viewable elements that are in the first portion that are not in the second portion, or any combination thereof. To illustrate, referring to FIG. 1, the display difference may correspond to a number of the viewable elements 111-115, a portion or a percentage of the content 102 that is shown at the display 101 in the first portion 120 that is not shown in a second portion. As another example, referring to FIG. 3, the displayed difference may correspond to an amount of rotation of the three-dimensional representation 312 about the axis 316. In another example, referring to FIG. 5, the display difference may correspond to a scroll rate or a rate of rotation of the three-dimensional representation 512 about the axis 516.

The method may also include, at 916, displaying the second portion at the display. In a particular embodiment, the second portion may continue to be updated as long as the orientation difference satisfies a threshold. For example, so long as the orientation difference is greater than, or is greater than or equal to, the threshold, the second portion may be updated, causing the display to scroll (as described with reference to FIGS. 5 and 6). Additionally, a magnitude of the orientation difference may be non-linearly related to the rate at which the display is updated (as described with reference to FIGS. 5 and 6). For example, a relatively small change in the orientation difference may result in a first update rate whereas a larger change in the orientation difference may result in skipping over portions of the content or fast forwarding to an end of a particular set of content.

The method of FIG. 9 may be implemented by a field-programmable gate array (FPGA) device, an application-specific integrated circuit (ASIC), a processing unit such as a central processing unit (CPU), a digital signal processor (DSP), a graphics processing unit (GPU), a controller, another hardware device, firmware device, or any combination thereof. As an example, the method of FIG. 9 can be performed by a processor that executes instructions.

Figure 10:
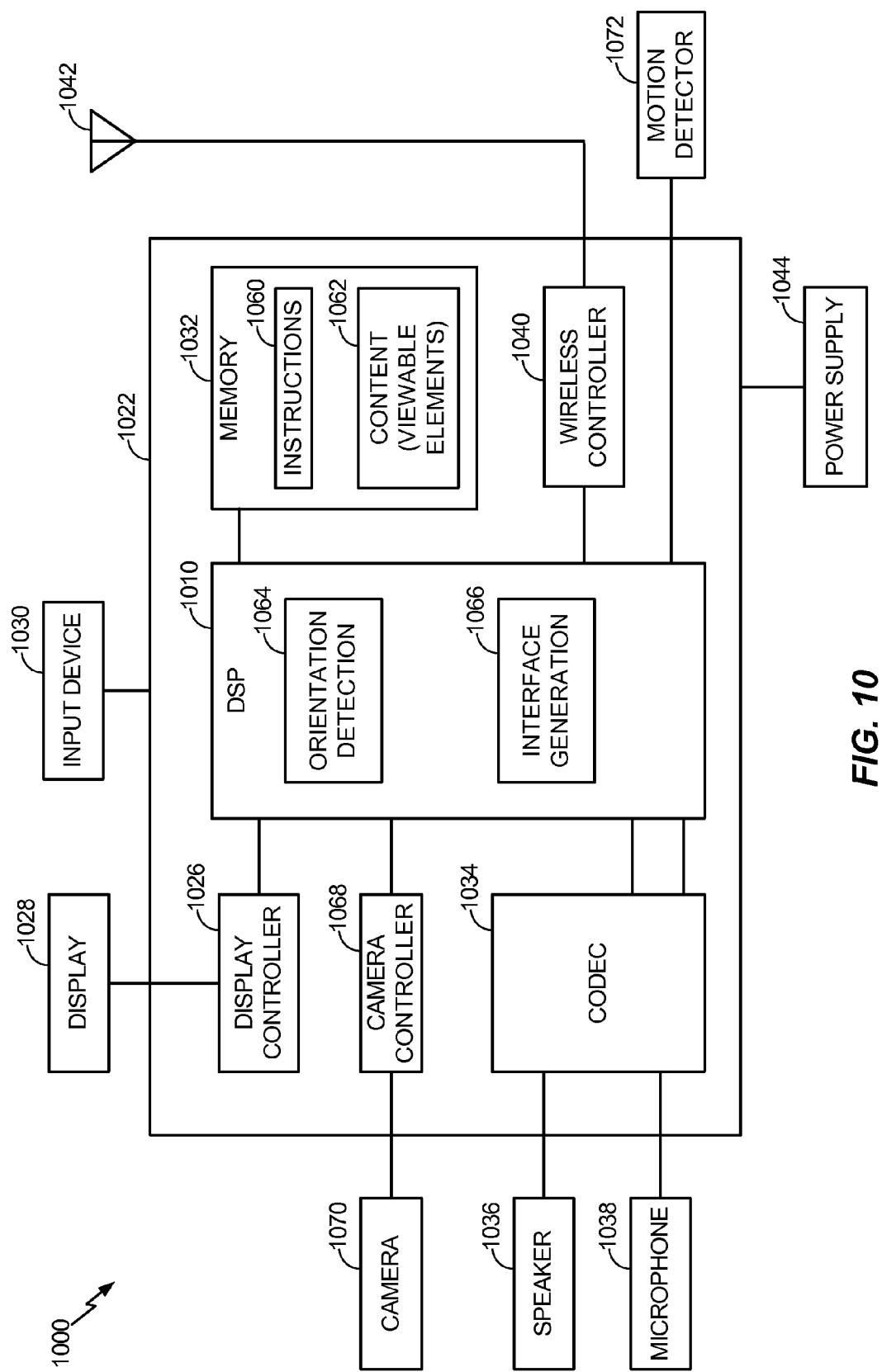
FIG. 10 is a block diagram of a portable computing device adapted to display content according to a particular illustrative embodiment.

FIG. 10 is a block diagram of a computing device adapted to display content according to a particular illustrative embodiment. The computing device 1000 may include a portable computing device, such as a wireless communication device. The computing device 1000 includes a processor, such as a digital signal processor (DSP) 1010, coupled to a memory 1032. The memory 1032 may include content 1062, such as one or more viewable elements. The memory 1032 may also include instructions 1060 that are executable by the processor to cause the processor to perform the method of FIG. 8, the method of FIG. 9, or any combination thereof. Additionally, or in the alternative, the processor may include components to perform the method of FIG. 8, the method of FIG. 9, or any combination thereof. To illustrate, the instructions 1060 or the processor may have orientation detection functionality 1064. Further, the instructions 1060 or the processor may have interface generation functionality 1066.

In an illustrative embodiment, the orientation detection functionality 1064 corresponds to a component, a system, or circuitry of the computing device 1000 that detects changes in the viewing angle using a motion detector 1072 of the computing device 1000, a camera 1070 of the computing device 1000, another sensor (not shown) of the computing device 1000, or any combination thereof. The motion detector 1072 may include an accelerometer, a gyroscope, a compass, a passive device (i.e., a device that senses ambient or environmental conditions to detect orientation), an active device (i.e., a device that generates a signal that is used to sense orientation), or any combination thereof.

The interface generation functionality 1066 may correspond to a component, a system, or circuitry of the computing device 1000 that is capable of generating a user interface including a portion of the content 1062, such as a user interface that displays the first portion 120 of FIG. 1. In a particular illustrative embodiment, the orientation detection functionality 1064 and the interface generation functionality 1066 are included in the instructions 1060. The interface generation functionally 1066 may be responsive to the orientation detection functionality 1064 to update a portion of the content 1062 displayed via a display 1028 when a change in orientation (e.g., viewing angle) is detected. The interface generation functionally 1066 may update the portion of the content 1062 that is displayed in a manner that is non-linearly related to the change in the orientation. For example, the changing in the viewing orientation may be represented as a first floating point number (e.g., a measured number of degrees). A display change, which corresponds to changes to be made to the content displayed, may be calculated as a second floating point number based on a non-linear relationship between the display change and the viewing orientation.

FIG. 10 also shows a display controller 1026 that is coupled to the DSP 1010 and to the display 1028. A coder/decoder (CODEC) 1034 can also be coupled to the digital signal processor 1010. A speaker 1036 and a microphone 1038 can be coupled to the CODEC 1034.

FIG. 10 also indicates that a wireless controller 1040 can be coupled to the digital signal processor 1010 and to an antenna 1042. In a particular embodiment, the DSP 1010, the display controller 1026, the memory 1032, the CODEC 1034, and the wireless controller 1040 are included in a system-in-package or system-on-chip device 1022. In a particular embodiment, an input device 1030 and a power supply 1044 are coupled to the system-on-chip device 1022. Moreover, in a particular embodiment, as illustrated in FIG. 10, the display 1028, the input device 1030, the speaker 1036, the microphone 1038, the camera 1070, the antenna 1042, the motion detector 1072, and the power supply 1044 are external to the system-on-chip device 1022. However, each of the display 1028, the input device 1030, the speaker 1036, the microphone 1038, the antenna 1042, and the power supply 1044 can be coupled to a component of the system-on-chip device 1022, such as an interface or a controller.

In conjunction with the described embodiments, a system is disclosed that may include interface means to generate a user interface for display at a display device, where the user interface includes a portion of content determined based on a viewing orientation of a user relative to the display device, such as the interface generation functionality 1066 of FIG. 10, one or more other devices or circuits configured to generate a user interface for display at a display device based on a viewing orientation, or any combination thereof. The system may also include orientation detection means to determine the viewing orientation and to detect a change in the viewing orientation, such as the sensor 214 of FIG. 2, the camera 1070 of FIG. 10, the motion detector 1072 of FIG. 10, the orientation detection functionality 1064 of FIG. 10, one or more other devices or circuits configured to detect a change in the viewing orientation, or any combination thereof.

Those of skill would further appreciate that the various illustrative logical blocks, configurations, modules, circuits, and algorithm steps described in connection with the embodiments disclosed herein may be implemented as electronic hardware, computer software executed by a processor, or combinations of both. Various illustrative components, blocks, configurations, modules, circuits, and steps have been described above generally in terms of their functionality. Whether such functionality is implemented as hardware or processor executable instructions depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the embodiments disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of non-transient storage medium known in the art. An exemplary storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description of the disclosed embodiments is provided to enable a person skilled in the art to make or use the disclosed embodiments. Various modifications to these embodiments will be readily apparent to those skilled in the art, and the principles defined herein may be applied to other embodiments without departing from the scope of the disclosure. Thus, the present disclosure is not intended to be limited to the embodiments shown herein but is to be accorded the widest scope possible consistent with the principles and novel features as defined by the following claims.

What is claimed is:

1. A method comprising:
receiving displayable content at a device having a display, the displayable content including a plurality of viewable elements;
determining a first portion of the displayable content based on a viewing orientation of a user relative to the display, wherein the first portion includes at least a first viewable element of the plurality of viewable elements and does not include at least one second viewable element of the plurality of viewable elements;
displaying the first portion of the displayable content at the display;
detecting an updated viewing orientation of the user relative to the display;
determining a second portion of the displayable content based on the updated viewing orientation, wherein the second portion includes at least the second viewable element, wherein a display difference between the first portion and the second portion is non-linearly related to an orientation difference between the viewing orientation and the updated viewing orientation, wherein the second viewable element includes a plurality of independent display windows, and wherein a first independent display window of the plurality of independent display windows is a user interface display of a first application operating at the device, and a second independent display window of the plurality of independent display windows is a user interface display of a second application operating at the device; and
displaying the second portion of the displayable content at the display.

2. The method of claim 1, wherein determining the second portion comprises selecting, with a non-linear relation to the orientation difference, a number of the plurality of independent display windows to be included in the second portion.

3. The method of claim 2, wherein the orientation difference is determined based on a measured movement of the display.

4. The method of claim 2, wherein the orientation difference is determined based on a measured change in a viewing angle of the user relative to the display.

5. The method of claim 4, wherein the change in the viewing angle is measured using a camera associated with the display.

6. The method of claim 1, wherein the first portion comprises a first plurality of viewable elements and the second portion comprises a second plurality of viewable elements, and wherein the display difference corresponds to a number of viewable elements that are distinct between the first plurality of viewable elements and the second plurality of viewable elements.

7. The method of claim 1, wherein detecting the updated viewing orientation includes at least one of detecting a location of an eye of the user and detecting a location of at least a portion of a user's face.

8. The method of claim 1, wherein the orientation difference corresponds to a change in a viewer-device relative geometry location.

9. The method of claim 1, wherein the updated viewing orientation is detected based at least in part on a detected gesture of the user.

10. The method of claim 1, wherein orientation difference is determined based at least in part on a measured movement of the device.

11. The method of claim 1, wherein the first independent display window of the plurality of independent display windows is a user interface display of a first instance of the first application, and a third independent display window of the plurality of independent display windows is a user interface display of a second instance of the first application.

12. The method of claim 1, further comprising:
determining a cylindrical representation of the displayable content based on a display size of the display, wherein the cylindrical representation includes a single curved face, wherein the first portion and the second portion correspond to portions of the cylindrical representation, and the display difference corresponds to an amount of rotation of the cylindrical representation about an axis.

13. The method of claim 12, wherein the orientation difference corresponds to an amount of rotation of the device, and wherein the amount of rotation of the device is non-linearly related to the amount of rotation of the cylindrical representation about the axis.

14. The method of claim 13, wherein a rate of the rotation of the cylindrical representation is determined based on the orientation difference.

15. The method of claim 1, wherein displaying the first portion of the displayable content comprises displaying the first portion of the displayable content at a first time, and wherein displaying the second portion of the displayable content comprises displaying the second portion of the displayable content at a second time that is subsequent to the first time, such that the first portion and the second portion are not displayed at the same time.

16. A device comprising:
one or more processors; and
a memory coupled to the one or more processors, the memory storing displayable content that includes a plurality of viewable elements, the memory further storing instructions that are executable by the one or more processors to:
operate a first application;
operate a second application;
determine a viewing orientation of a user relative to a display;
provide a first portion of the content to the display based on the viewing orientation, wherein the first portion includes at least a first viewable element of the content and does not include at least one second viewable element of the content;
determine an updated viewing orientation of the user; and
provide an updated portion of the content to the display based on the updated viewing orientation, wherein the updated portion includes at least the second viewable element, wherein a display difference between the first portion and the updated portion is non-linearly related to an orientation difference between the viewing orientation and the updated viewing orientation, wherein the second viewable element includes a plurality of independent display windows, and wherein a first independent display window of the plurality of independent display windows is a user interface display of the first application, and a second independent display window of the plurality of independent display windows is a user interface display of the second application.

17. The device of claim 16, wherein the display is integral to the apparatus.

18. The device of claim 17, further comprising a camera coupled to the processor.

19. The device of claim 18, wherein the instructions are further executable by the one or more processors to determine a viewing orientation of the user relative to the display based on one or more images captured by the camera.

20. The device of claim 16, wherein the first independent display window of the plurality of independent display windows is a user interface display of a first instance of the first application, and a third independent display window of the plurality of independent display windows is a user interface display of a second instance of the first application.

21. The device of claim 16, wherein the memory further includes instructions that are executable by the one or more processors to:
determine a cylindrical representation of the displayable content based on a display size of the display, wherein the cylindrical representation includes a single curved face, wherein the first portion and the updated portion correspond to portions of the cylindrical representation, and the display difference corresponds to an amount of rotation of the cylindrical representation about an axis.

22. The apparatus of claim 16, wherein the instructions that are executable by the processor to display the first portion of the content comprise instructions that are executable by the processor to display the first portion of the displayable content at a first time, and wherein the instructions that are executable by the processor to display the second portion of the displayable content comprise instructions that are executable by the processor to display the second portion of the displayable content at a second time that is subsequent to the first time, such that the first portion and the second portion are not displayed at the same time.

23. A device comprising:
interface means to generate a user interface for display at a display device, wherein the user interface includes a portion of content determined based on a viewing orientation of a user relative to the display device; and
orientation detection means to determine the viewing orientation and to detect a change in the viewing orientation;
wherein the interface means determines a first portion of the content based on a first viewing orientation, wherein the first portion includes at least a first viewable element of the content and does not include at least one second viewable element of the content;
wherein the interface means determines a second portion of the content in response to a change in the viewing orientation to a second viewing orientation, the second portion of the content including at least the second viewable element;
wherein a display difference between the first portion and the second portion is non-linearly related to an orientation difference between the first viewing orientation and the second viewing orientation; and
wherein the second viewable element includes a plurality of independent display windows, and wherein a first independent display window of the plurality of independent display windows is a user interface display of a first application operating at the device, and a second independent display window of the plurality of independent display windows is a user interface display of a second application operating at the device.

24. The device of claim 23, wherein the interface means continues to update the portion of the content displayed while the orientation detection means indicates that the orientation difference satisfies a threshold.

25. The device of claim 24, wherein a rate at which the interface means updates the portion of the content displayed is non-linearly related to a magnitude of the orientation difference.

26. The device of claim 24, wherein the orientation difference is determined based on a measured change in a viewing angle of the user relative to the display device.

27. The device of claim 26, wherein the orientation detection means measures the change in the viewing angle using a camera associated with the display device.

28. The device of claim 24, wherein detecting the change in the viewing orientation includes at least one of: detecting a location of an eye of the user and detecting a location of at least a portion of a user's face.

29. The device of claim 24, further comprising movement detection means to detect movement of the display device, wherein the change in the viewing orientation is determined based at least in part on a measured movement of the display device.

30. The device of claim 24, wherein a third portion of the content is determined in response to a change in the viewing orientation from the second viewing orientation to a third viewing orientation, wherein a second display difference between the second portion and the third portion is greater than the display difference between the first portion and the second portion.

31. The device of claim 23, wherein the first independent display window of the plurality of independent display windows is a user interface display of a first instance of the first application, and a third independent display window of the plurality of independent display windows is a user interface display of a second instance of the first application.

32. The device of claim 23, wherein the interface means comprise means for determining a cylindrical representation of the displayable content, wherein the cylindrical representation includes a single curved face, wherein the first portion and the updated portion correspond to portions of the cylindrical representation, and the display difference corresponds to an amount of rotation of the cylindrical representation about an axis.

33. The apparatus of claim 23, wherein the interface means generate the user interface to include the first portion of the content at a first time, and wherein the interface means generate the user interface to include the second portion of the content at a second time that is subsequent to the first time, such that the first portion and the second portion are not displayed at the same time.

34. A non-transitory computer-readable medium comprising processor-executable instructions that, when executed by one or more processors, cause the one or more processors of a device to:
  determine a viewing orientation of a user relative to a display;
  provide a portion of displayable content to the display based on the viewing orientation, wherein the portion includes at least a first viewable element of the content and does not include at least one second viewable element of the content;
  determine an updated viewing orientation of the user; and
  update the portion of the displayable content based on the updated viewing orientation, wherein the updated portion includes at least the second viewable element, wherein a display difference between the portion and the updated portion is non-linearly related to an orientation difference, and wherein the second viewable element includes a plurality of independent display windows, and wherein a first independent display window of the plurality of independent display windows is a user interface display of a first application operating at the device, and a second independent display window of the plurality of independent display windows is a user interface display of a second application operating at the device.

35. The non-transitory computer-readable medium of claim 34, wherein the instructions are further executable by the one or more processors to generate a three-dimensional representation of the content comprising a plurality of viewable elements of the content, wherein the portion corresponds to part of the three-dimensional representation.

36. The non-transitory computer-readable medium of claim 35, wherein the orientation difference corresponds to a change of viewing angle of the user relative to the display.

37. The non-transitory computer-readable medium of claim 36, wherein the display difference corresponds to a rate of rotation of the three-dimensional representation, and wherein the rate of rotation of the three-dimensional representation is non-linearly related to the orientation difference.

38. The non-transitory computer-readable medium of claim 35, wherein the three-dimensional representation includes the plurality of viewable elements arranged in a cylindrical configuration.

39. The non-transitory computer-readable medium of claim 34, wherein the instructions are executable by the one or more processors to continue to update the portion as long as the orientation difference exceeds a threshold.

40. The non-transitory computer-readable medium of claim 39, wherein a rate at which the portion continues to be updated is non-linearly related to the orientation difference.

41. The non-transitory computer-readable medium of claim 34, wherein the first and the second viewable elements include independent display windows.

42. The non-transitory computer-readable medium of claim 41, wherein the first viewable element is an independent display window.

43. The non-transitory computer-readable medium of claim 42, wherein the first independent display window of the plurality of independent display windows is a user interface display of a first instance of the first application, and a third independent display window of the plurality of independent display windows is a user interface display of a second instance of the first application.

44. The non-transitory computer-readable storage medium of claim 34, wherein the instructions are further executable by the one or more processors to determine a cylindrical representation of the displayable content based on a display size of the display, wherein the cylindrical representation includes a single curved face, wherein the first portion and the updated portion correspond to portions of the cylindrical representation, and the display difference corresponds to an amount of rotation of the cylindrical representation about an axis.

45. The non-transitory computer-readable storage medium of claim 34, wherein the instructions that cause the processor to provide the portion of the content comprise instructions that cause the processor to provide the portion of the content at a first time, and wherein the instructions that cause the processor to update the portion of the displayable content comprise instructions that cause the processor to update the portion of the displayable content at a second time that is subsequent to the first time, such that the first portion and the second portion are not provided to the display at the same time.

* * * * *